May 10, 1932. E. M. BIDWELL 1,857,835
APPARATUS FOR HANDLING STRAND MATERIAL
Filed April 30, 1930
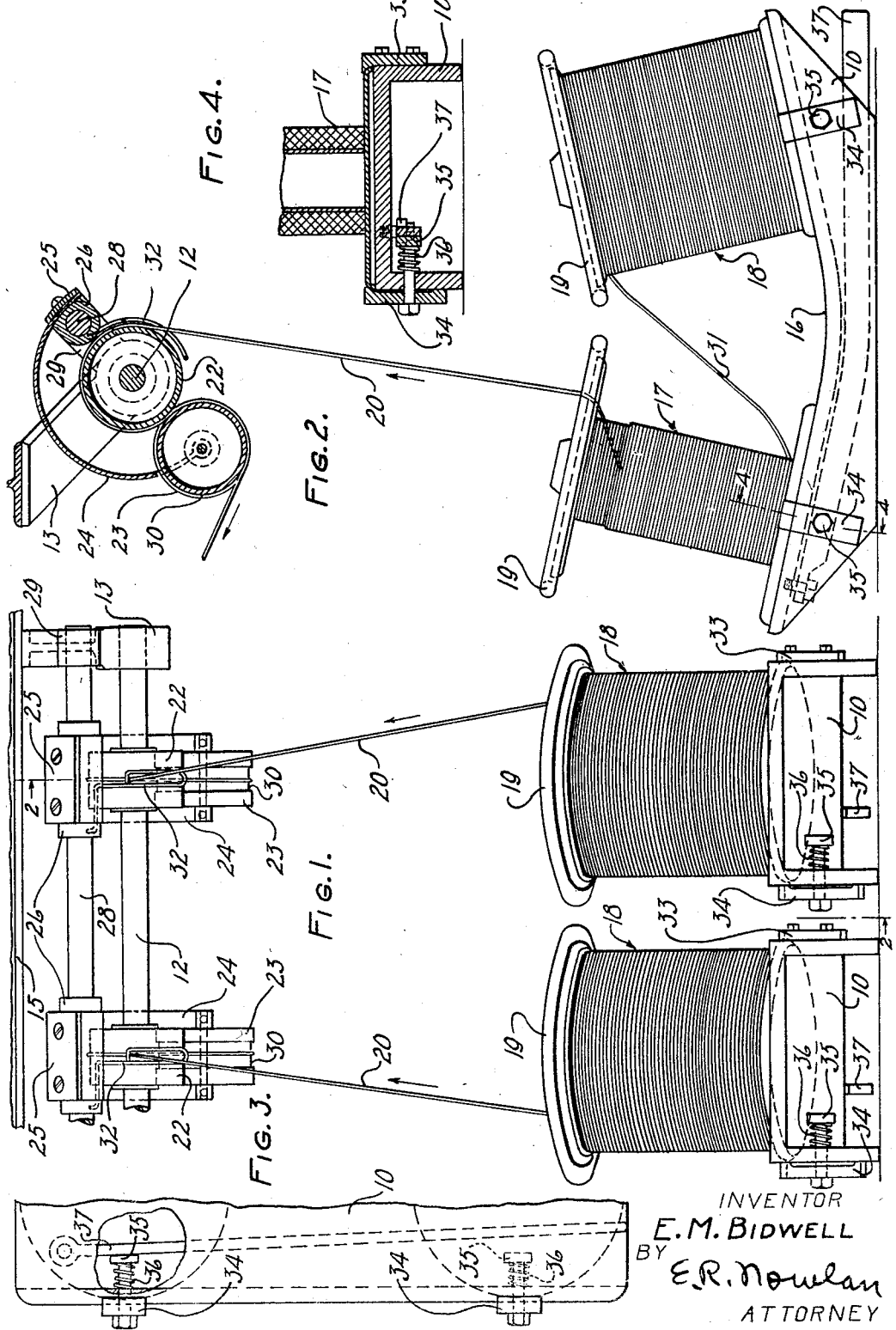
INVENTOR
E. M. BIDWELL
BY E. R. Nowlan
ATTORNEY Patented May 10, 1932

1,857,835

UNITED STATES PATENT OFFICE

EDGAR M. BIDWELL, OF RIVERSIDE, ILLINOIS, ASSIGNOR TO WESTERN ELECTRIC COMPANY, INCORPORATED, OF NEW YORK, N. Y., A CORPORATION OF NEW YORK

APPARATUS FOR HANDLING STRAND MATERIAL

Application filed April 30, 1930. Serial No. 448,479.

This invention relates to apparatus for handling strand material, and has for its principal object the provision of a simple and inexpensive apparatus for supplying strand material uninterruptedly, under a constant tension, and at a uniform speed.

One embodiment of the invention contemplates the provision of an apparatus for continuously supplying a plurality of strands or wires to a coating or insulating machine, wherein a plurality of strand or wire supply spools are arranged in pairs with their axes inclined toward each other, the pairs being arranged in rows underneath a common horizontal shaft rotatably supported in an overhead framework. The wires from one supply spool of each pair pass over individual rollers fixed to the common shaft and then around grooved tension rollers which are arranged to press the wires against the other cooperating rollers under the action of arcuate shaped adjustable springs, whereby the wires are supplied to the insulating machine under a constant predetermined tension. The supply spools of each pair are interconnected in such manner that when the wire on one spool becomes exhausted, the other spool is automatically placed in service without interrupting the supply. Also, the supply spools are so positioned that one spool, upon its exhaustion, may be replaced by a full spool without interrupting the supply of wire to the insulating machine or other apparatus.

It is believed that a complete understanding of the invention will be had from the following description taken in conjunction with the accompanying drawings, wherein Fig. 1 is a fragmentary elevational view of an apparatus embodying the features of the invention;

Fig. 2 is a vertical section on line 2—2 of Fig. 1;

Fig. 3 is a fragmentary plan view, partly in section, of one of the spool supporting stands; and Fig. 4 is a fragmentary section on line 4—4 of Fig. 2.

Referring now to the drawings, the numerals 10—10 indicate a plurality of spool supporting stands arranged side by side underneath a common horizontal shaft 12 rotatably supported in brackets 13 depending from an overhead I-beam 15. The spool stands 10 are each formed with a concave or inclined upper surface 16 (Fig. 2) designed to support a pair of strand or wire supply spools 17 and 18 with their axes inclined toward each other. The supply spools are provided with individual fliers 19 for facilitating the withdrawal of the wire therefrom. The fliers are preferably readily removable so that they may be quickly transferred from one spool to another.

Wires 20 drawn from one of each pair of supply spools pass over spaced rollers 22 secured to the common rotatable shaft 12 and then around grooved idler rollers 23 carried upon one end of arcuate springs 24, the other ends of which are adjustably secured by means of clamping plates 25 to individual sleeves or bushings 26 mounted upon a common horizontal shaft 28 spaced from the shaft 12 and supported in arms 29 integral with the brackets 13.

The roller 23 is provided with a wide peripheral groove 30 which cooperates with a loop wire guard 32 depending from the sleeve 26 to prevent displacement of the wire from the roller 22, while permitting a limited amount of lateral movement of the wire across the face of this roller, thereby preventing excessive frictional wear at any one point. The depth of the groove 30 is slightly less than the thickness of the wire, whereby the moving wire is pressed against the roller 22 under the action of the arcuate spring 24 and is thus delivered to the insulating machine or other apparatus under a predetermined tension. As the tension in the wire increases, the grooved roller 23 is gradually moved away from the roller 22 thus relieving the braking pressure or drag on the wire. It will be obvious that the movement of the tension roller 23 is eccentric with respect to the axis of the roller 22.

The wires on the supply spools are brazed, welded or otherwise interconnected, as indicated at 31 (Fig. 2), so that when the wire on a given spool becomes exhausted the other spool is automatically placed in service without interrupting the supply of wire to the insulating machine. Furthermore, the empty spool may be replaced by a full spool and the outer end of the wire on the full spool may be connected to the inner end of the wire on the spool in service without interrupting the supply.

The supply spools are maintained in fixed relative positions with respect to the supporting stand 10 by means of cooperating clamping members 33 and 34 arranged to engage diametrically opposed edge portions of the lower head of the supply spool as shown in Fig. 4. The clamping members 33 are rigidly secured to one side of the spool stand, while the clamping members 34 are mounted upon headed pins or bolts 35 slidable in the opposite side of the spool stand and provided with coil springs 36 which serve to press the members 34 inwardly, whereby the supply spools are yieldably clamped between clamping member 33 and clamping member 34.

By manually pressing the spring pressed bolt 35 to the left (Figs. 3 and 4) against the action of spring 36 and thereby releasing the clamping member 34, the associated supply spool may be readily and quickly removed or replaced by another spool. In instances where the clamping member 34 is not within convenient reach of the operator, a pivoted hand lever 37 extending to within convenient reach of the operator may be provided for disengaging the clamping member to permit the removal of the spool. The hand lever 37 may be mounted and positioned as shown in Fig. 3, so that upon its movement to the left the spring pressed clamping member 34 is disengaged from the spool.

It is believed that the novel features and advantages of the invention will be clearly apparent from the above description. The moving wires, in passing over the individual rollers 22, cause rotation of these rollers. The tendency of any of the wires to slip or run ahead of their associated rollers is reduced to a minimum by the spring pressed tension rollers 23, which press the wires against the peripheries of the rollers as hereinbefore described. Thus, the linear speed of the wires is controlled by the surface speeds of the associated rollers 22, and since these rollers are all secured to a common rotatable shaft, it is obvious that their surface speeds are the same, and therefore the linear speeds of all of the wires are substantially uniform.

It is to be understood that the embodiment of the invention herein illustrated and described represents merely one useful form of the invention which is capable of modifications and numerous other applications within the scope of the appended claims.

What is claimed is:

1. In an apparatus for handling strand material, a plurality of strand supplies, a rotatable shaft common to all the supplies, strand engaging rollers individual to the supplies and secured to the common shaft, and means cooperating with the rollers for maintaining the strands under constant tension.

2. In an apparatus for handling strands, a plurality of strand supplies arranged in pairs, a horizontal rotatable shaft positioned above the supplies, a plurality of spaced strand engaging rollers secured to the shaft and individual to each pair of supplies, and spring pressed pressure rollers for cooperating with the first mentioned rollers to control the tension of strands drawn from the supplies.

3. In an apparatus for handling strands, a plurality of strand supplies, a rotatable shaft common to all of the supplies, strand engaging rollers individual to the supplies and secured to the shaft, and spring pressed tension rollers for maintaining the strand under constant tension and for cooperating with the first mentioned rollers to control the linear speeds of the strands.

4. In an apparatus for handling moving strands, a rotatable shaft common to all of the strands, strand engaging rollers individual to the strands and driven thereby, the rollers being secured to the common shaft, and grooved tension rollers for guiding the moving strands and for maintaining them under a constant tension.

In witness whereof, I hereunto subscribe my name this 21st day of April, A. D. 1930.

EDGAR M. BIDWELL.